United States Patent
Liu et al.

(10) Patent No.: US 6,788,363 B2
(45) Date of Patent: Sep. 7, 2004

(54) REFLECTOR STRUCTURE OF A MULTI-DOMAIN LIQUID CRYSTAL DISPLAY AND ITS FABRICATION METHOD

(75) Inventors: Hong-Da Liu, Chu-Pei (TW); Hung-Huei Hsu, Hsinchu (TW); Wen-Chung Tang, Chia-Yi Hsien (TW); Wen-Jian Lin, Hsinchu (TW)

(73) Assignee: Prime View International Corp. Ltd., Hsinchu (TW)

( * ) Notice: Subject to any disclaimer, the term of this patent is extended or adjusted under 35 U.S.C. 154(b) by 0 days.

(21) Appl. No.: 10/095,144

(22) Filed: Mar. 11, 2002

(65) Prior Publication Data

US 2003/0123005 A1 Jul. 3, 2003

(30) Foreign Application Priority Data

Dec. 31, 2001 (TW) ........................................ 90133112 A

(51) Int. Cl.[7] ............................................ G02F 1/1335
(52) U.S. Cl. ........................................................ 349/113
(58) Field of Search ........................ 349/113, 43, 138, 349/187; 438/30

(56) References Cited

U.S. PATENT DOCUMENTS

| | | | | |
|---|---|---|---|---|
| 5,621,556 A | * | 4/1997 | Fulks et al. ................... 349/42 |
| 5,708,486 A | * | 1/1998 | Miyawaki et al. ............ 349/44 |
| 5,877,831 A | * | 3/1999 | Leenhouts et al. .......... 349/113 |
| 5,905,548 A | * | 5/1999 | Shimada ....................... 349/38 |
| 6,081,310 A | * | 6/2000 | Katsuya et al. ............. 349/113 |
| 6,175,395 B1 | * | 1/2001 | Yamazaki et al. ............ 349/44 |
| 6,266,111 B1 | * | 7/2001 | Kataoka et al. ............. 349/113 |
| 6,342,935 B1 | * | 1/2002 | Jang et al. .................. 349/113 |
| 6,373,540 B1 | * | 4/2002 | Munakata .................... 349/117 |
| 6,522,375 B1 | * | 2/2003 | Jang et al. .................. 349/113 |
| 6,525,792 B1 | * | 2/2003 | Fujioka et al. .............. 349/113 |
| 6,559,917 B2 | * | 5/2003 | Ikeno ......................... 349/113 |

* cited by examiner

*Primary Examiner*—Robert H. Kim
*Assistant Examiner*—Richard H Kim

(57) ABSTRACT

A reflector structure in a multi-domain liquid crystal display comprises an active matrix device structure having regions of various height levels, a diffusing layer, and a structure of multi-domain reflective layer. The diffusing layer is formed above the active matrix device structure with multiple extruded bumps of various film thickness and various heights and shapes. The reflector structure has various reflective angles and reflective effects to improve the quality of LCD panel. It can be used in the reflective layer of a reflective or semi-reflective TN, STN, TFT, or TFD. The reflector fabrication process uses conventional process for a metal or an insulation layer on a TFT substrate to form multiple domains within a pixel area. After forming the cell structure of the multi-domain reflective layer, liquid crystal cells form multiple domains within a pixel area.

3 Claims, 19 Drawing Sheets

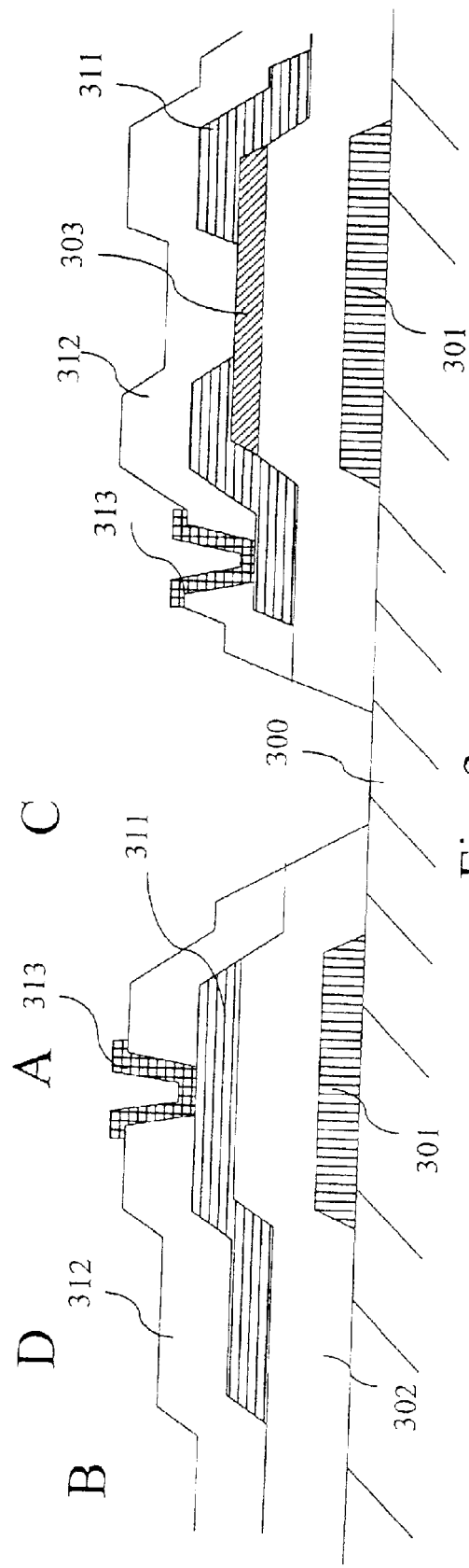
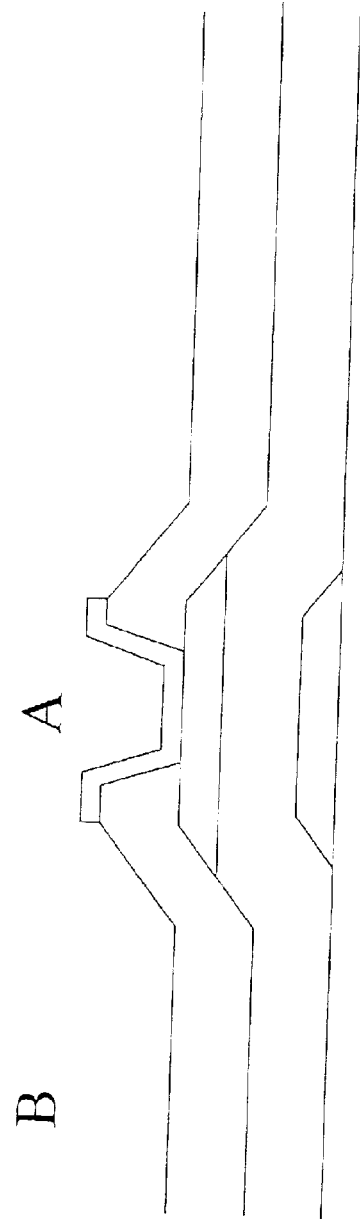
Fig. 3a
Fig. 3b

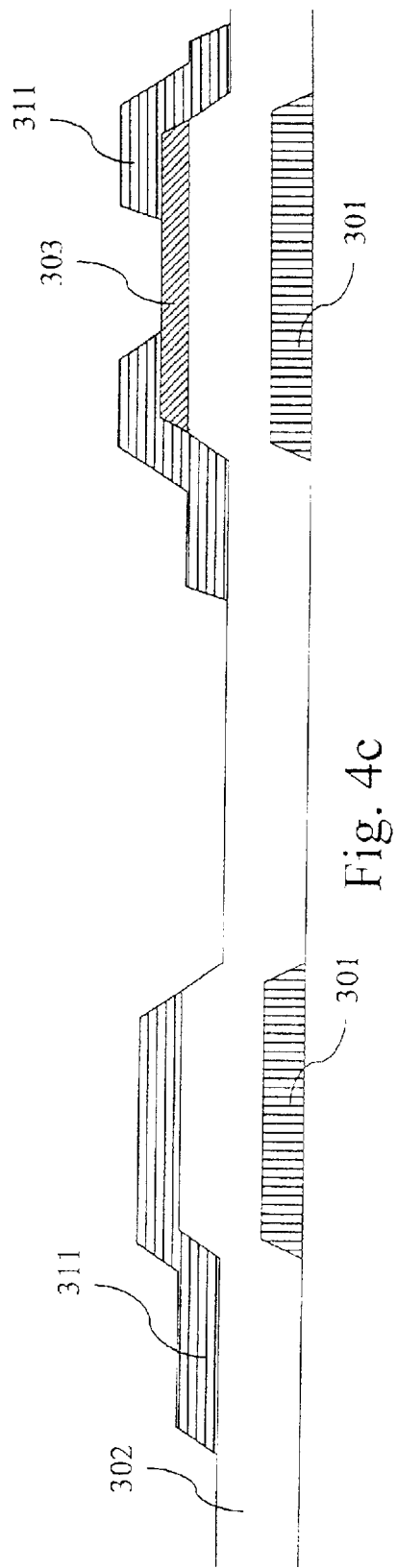
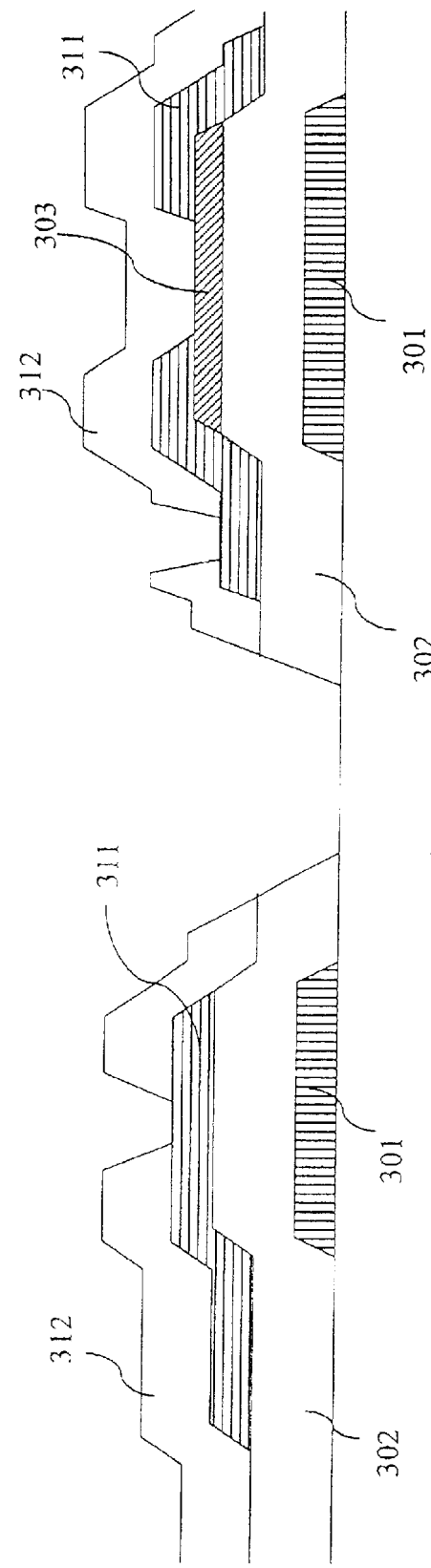
Fig. 4c
Fig. 4d

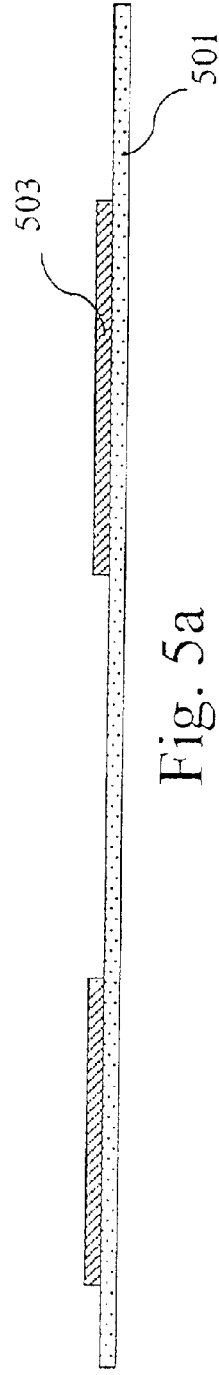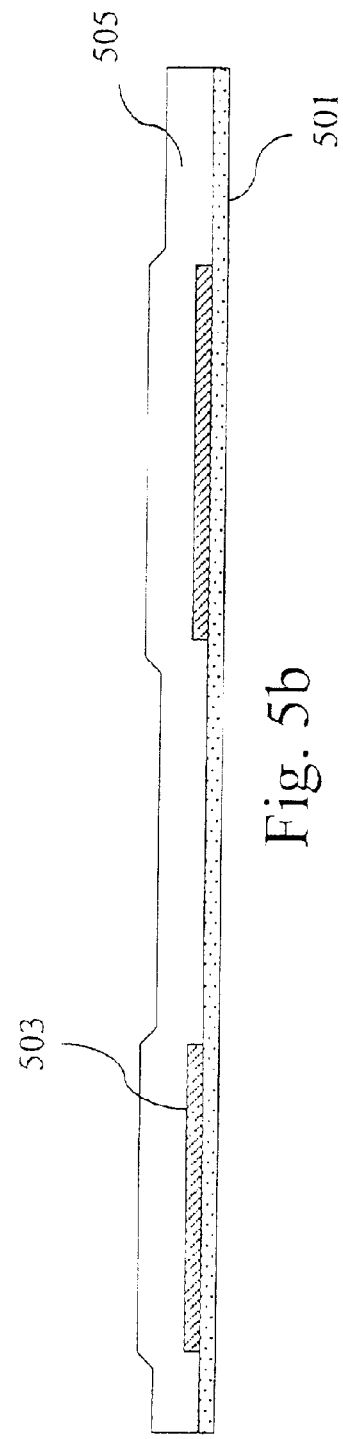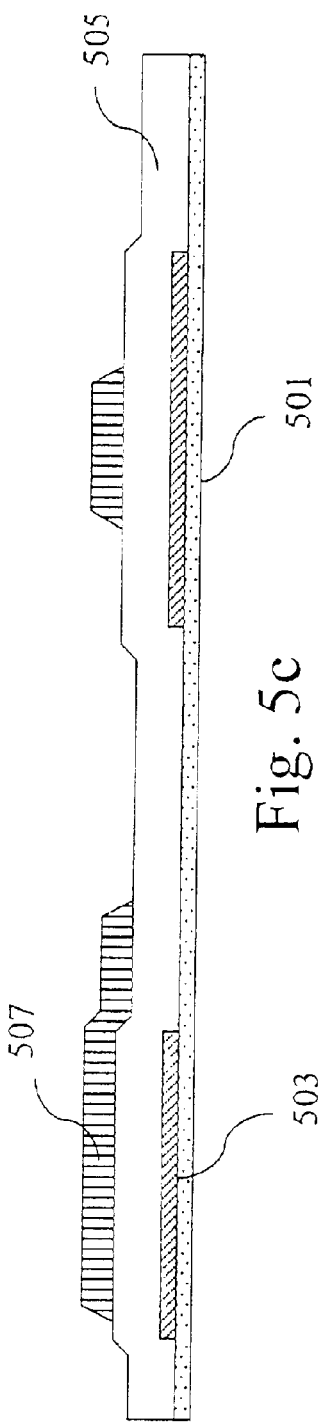

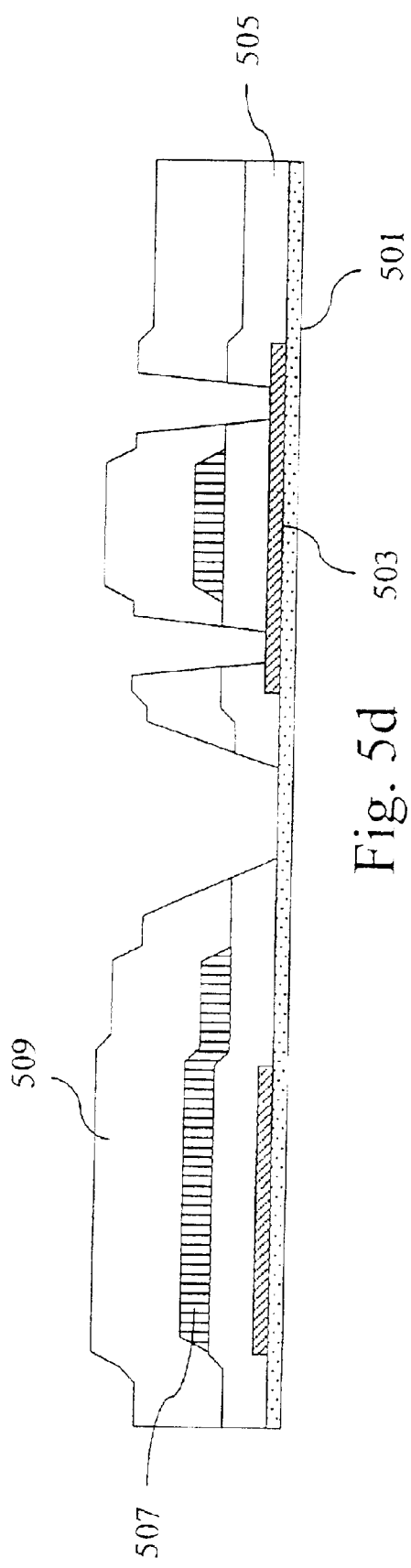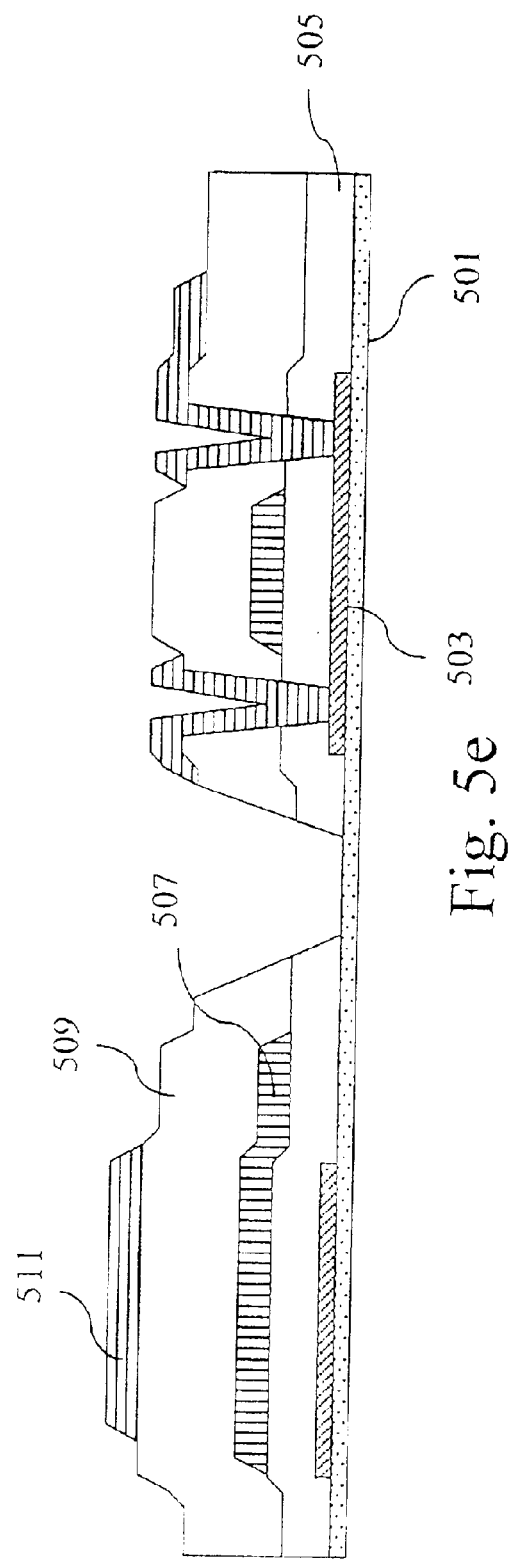

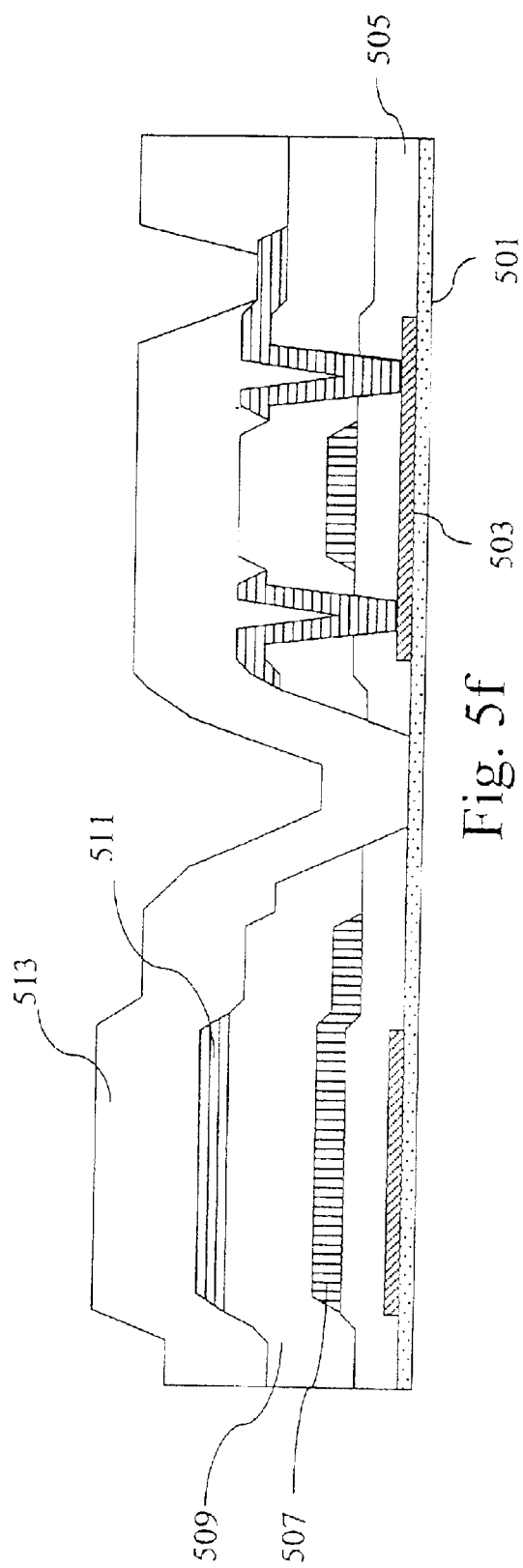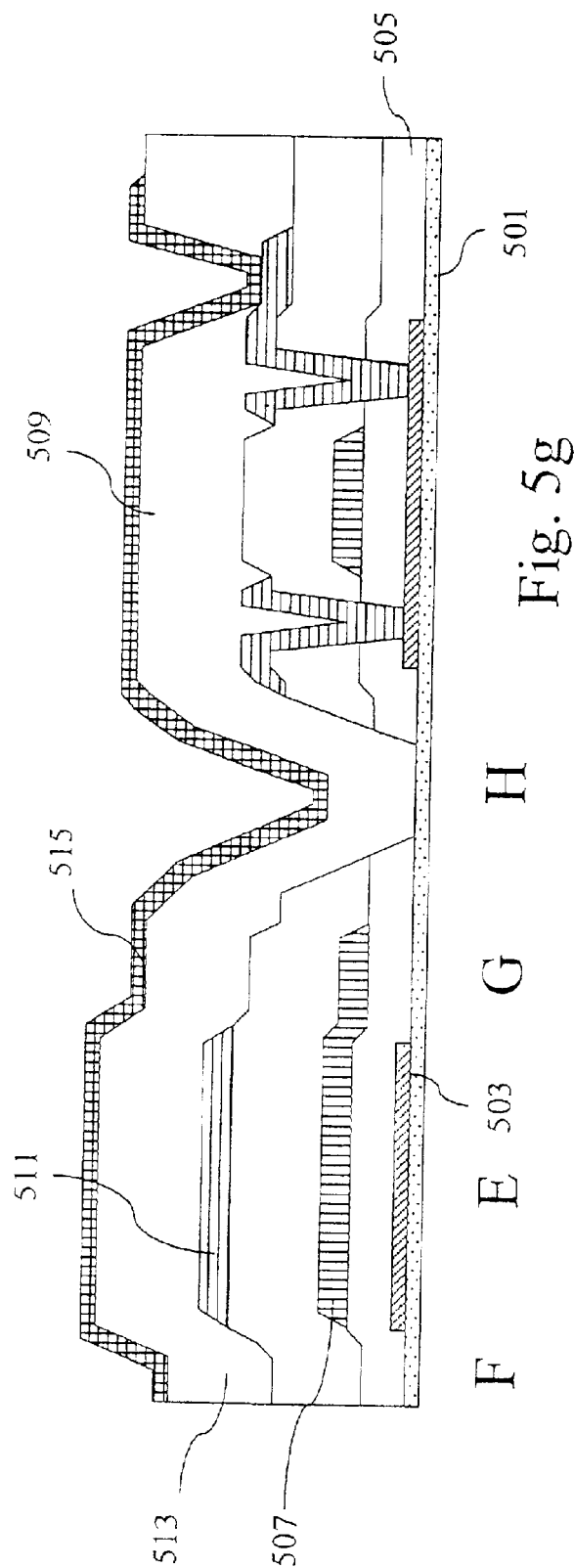

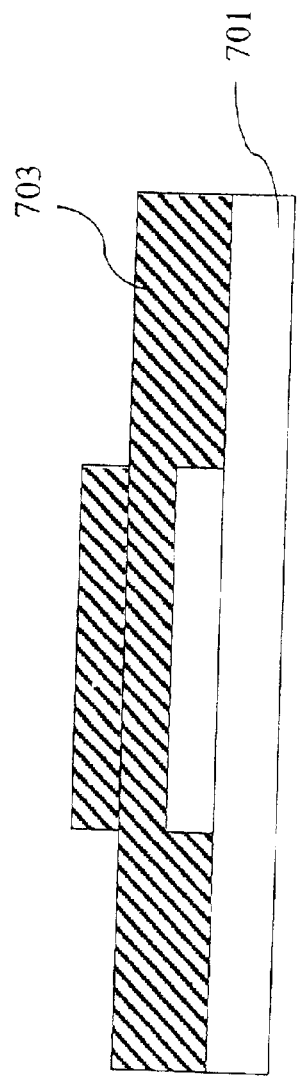
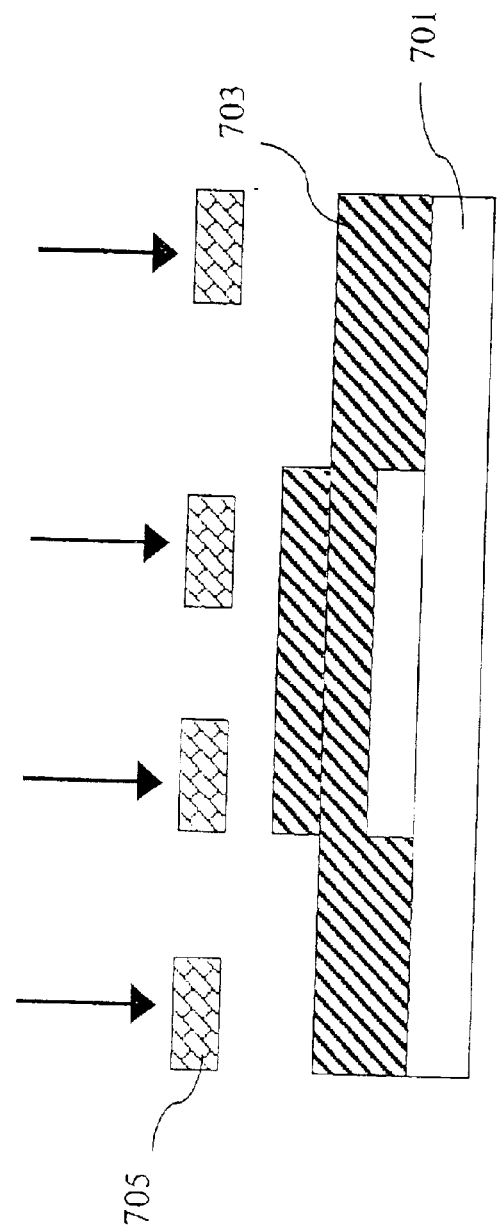

REFLECTOR STRUCTURE OF A MULTI-DOMAIN LIQUID CRYSTAL DISPLAY AND ITS FABRICATION METHOD

FIELD OF THE INVENTION

The present invention relates generally to a reflector structure in a multi-domain liquid crystal display (MD-LCD), and more specifically to a reflector structure that is used in a reflective or semi-reflective multi-domain liquid crystal display and the method for manufacturing the same.

BACKGROUND OF THE INVENTION

The market for liquid crystal display (LCD) panels is growing rapidly. Most conventional reflective, or semi-reflective liquid crystal displays are horizontally aligned twisted nematic. Liquid crystal directors of these liquid crystal displays form a single domain in a transmittive region or reflective region when an electrical voltage of a gray scale signal is applied. As shown in FIG. 1a, directors of liquid crystal molecules 103 forming a single domain in the layer between two dielectric substrates 101 and 102 point to the same direction, and have the same pre-tilt angle when a voltage is applied. In a liquid crystal display having multiple domains, directors of liquid crystal molecules 113 shown in FIG. 1b point to different directions, and have different pre-tilt angles.

The gray scale switching effect of liquid crystal molecules in a multi-domain liquid crystal display is better than that of liquid crystal molecules in a single domain liquid crystal display. Also, the gray scale inversion (GSI) region of liquid crystal molecules in a multi-domain liquid crystal display is smaller than that of liquid crystal molecules in a single domain liquid crystal display. These facts can be seen from equal contrast ratio contours shown in FIGS. 2a–2c.

FIG. 2a shows equal contrast ratio contours of liquid crystal molecules in a single domain liquid crystal display where the applied voltages are 1.5 volts and 2.5 volts and the pre-tilt angle of liquid crystal molecules is 1°. Label 201 indicates the gray scale inversion region of liquid crystal molecules in the single domain liquid crystal display. FIG. 2b shows equal contrast ratio contours of liquid crystal molecules in a single domain liquid crystal display where the applied voltages are 1.5 volts and 2.5 volts and the pre-tilt angle of liquid crystal molecules is 12°. Label 203 indicates the gray scale inversion region of liquid crystal molecules in the single domain liquid crystal display. FIG. 2c shows equal contrast ratio contours of liquid crystal molecules in a multi-domain liquid crystal display where the applied voltages are 1.5 volts and 2.5 volts and pre-tilt angles of liquid crystal molecules are between 1° and 12°. Label 205 indicates the gray scale inversion region of liquid crystal molecules in the multi-domain liquid crystal display. From these figures it can be seen that the gray scale inversion region in a multi-domain liquid crystal display is smaller than that in a single domain liquid crystal display. Therefore, a multi-domain liquid crystal display has a better gray scale switching effect and an improved viewing angle.

SUMMARY OF THE INVENTION

The present invention has been made to overcome the above-mentioned drawbacks of a conventional reflective, or semi-reflective liquid crystal display in which the arrangement of liquid crystal molecules forms a single domain. The primary object is to provide a reflector structure that can be used in a reflective, or semi-reflective multi-domain liquid crystal display and the method for manufacturing the same.

According to the invention, the reflector structure in a multi-domain liquid crystal display comprises an active matrix device structure having regions of various height levels, a diffusing layer, and a structure of multi-domain reflective layer. The diffusing layer is formed above the active matrix device structure with multiple extruded bumps of various film thickness and various heights and shapes. The multi-domain reflective layer is deposited on the diffusing layer.

According to the invention, after the cell structure of the multi-domain reflective layer is fabricated, liquid crystal cells form multiple domains within a pixel area. Comparing with conventional single domain liquid crystal displays, the multi-domain liquid crystal display of the invention has a better gray scale switching effect and an improved viewing angle. In addition, the reflector structure of the invention forms multiple domains within a pixel area. Therefore, it has advantages of various reflective angles and good reflective effects. The quality of LCD panel is hence improved.

The reflector fabrication process for a liquid crystal display of the invention uses primarily conventional process for a metal or an insulation layer of an active matrix device to form multiple domains within a pixel area. The reflector fabrication process comprises the preparation of a dielectric substrate and the fabrication of an active matrix device, and a structure of a multi-domain reflective layer. During the fabrication, a dielectric substrate having top and bottom surfaces is first prepared. An active matrix device structure is formed on the dielectric substrate by using multiple photo-masks. The active matrix device structure has at least one region of different height level. A structure of the multi-domain reflective layer is then formed on the active matrix device structure with regions of various height levels by using a multi-gap reflector process.

According to the invention, the film thickness of the structure of the multi-domain reflective layer is different at different locations. The diffusing effect is different too. After the cell structure of the multi-domain reflective layer is formed, the average cell gap effect is also different. Therefore, the optical effect of the LCD has an average effect to improve the grayscale. In addition, the diffusing layer formed above the active matrix device structure has multiple extruded bumps of various film thickness and various heights and shapes thereon. Therefore, the diffusing effect is better.

The structure of the multi-domain reflective layer of the invention can be used in a reflective or semi-reflective twisted nematic (TN), super twisted nematic (STN), thin film transistor (TFT), or thin film diode (TFD). After coating a reflective metal layer and forming the cell structure of the multi-domain reflective layer, the multi-domain structure can be used in a reflective or semi-reflective TFT-LCD such as self-compensated twisted nematic (SCTN), reflective twisted nematic (RTN), reflective electrical controlled birefrigence (R-ECB) or mixed mode twisted nematic (MTN) TFT-LCD.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 3a shows a cross-sectional view of an active matrix device structure according to the invention.

FIG. 3b shows a cross-sectional view of forming two regions B and A of different height levels on an active matrix device structure according to the invention.

FIGS. 4a–4d show sequentially the processes for forming four regions of various height levels on an active matrix device structure as shown in FIG. 3a according to an embodiment of the invention.

FIGS. 5a–5g show another preferred embodiment that uses a low temperature poly-Si structure for the active matrix device having four regions of various height levels according to the invention.

FIG. 7a shows a cross-sectional view of a simplified reflector structure with two regions of different height levels after depositing a layer of photo-resist material.

FIG. 7b shows that a photo-mask is used to expose the layer of photo-resist material.

FIG. 8 shows a cross-sectional view of a structure of multi-domain reflective layer manufactured by the multi-gap reflector process on an active matrix device structure with four regions of various height levels as shown in FIG. 3a.

FIG. 9a shows a top view of an active matrix device structure with three regions of various height levels within a pixel area.

FIG. 9b shows a patterned photo-mask used to expose the layer of the photo-resist material in the multi-gap reflector process.

FIG. 9c shows that a diffusing layer with multiple extruded bumps of various film thickness and various heights and shapes is formed on the three regions B, A and C of various height levels after the multi-gap reflector process.

DETAILED DESCRIPTION OF THE PREFERRED EMBODIMENTS

Figure 1B:
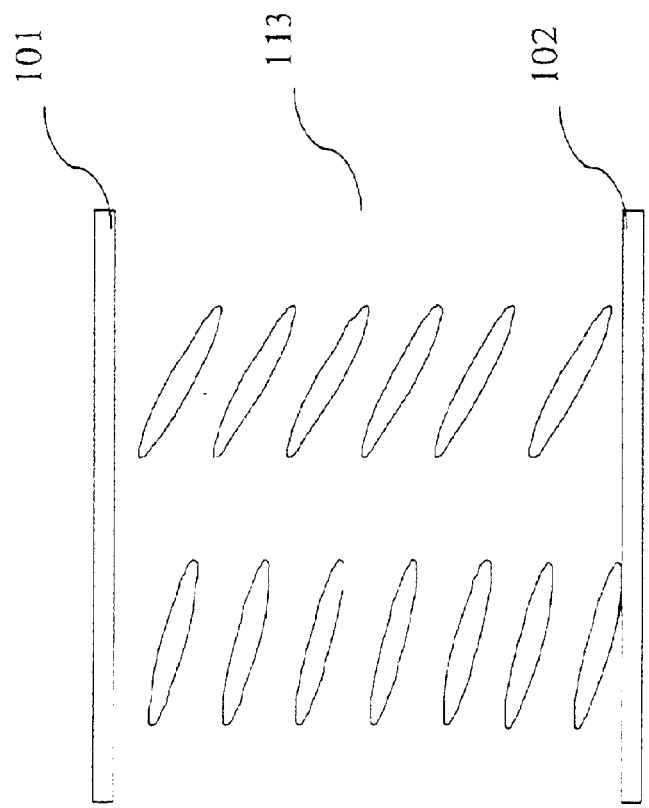
FIG. 1b shows that directors of liquid crystal molecules in a conventional multi-domain liquid crystal display point to different directions, have different pre-tilt angles, and form multiple domains when an electrical voltage of a gray scale signal is applied.
Figure 1A:
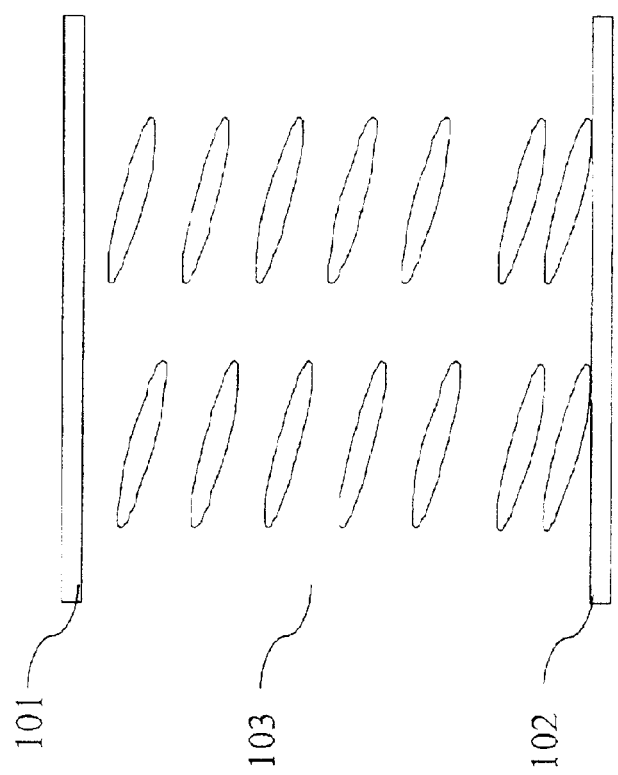
FIG. 1a shows that directors of liquid crystal molecules in a conventional reflective or semi-reflective liquid crystal display form a single domain in a transmittive or reflective region when an electrical voltage of a gray scale signal is applied.
Figure 2A:
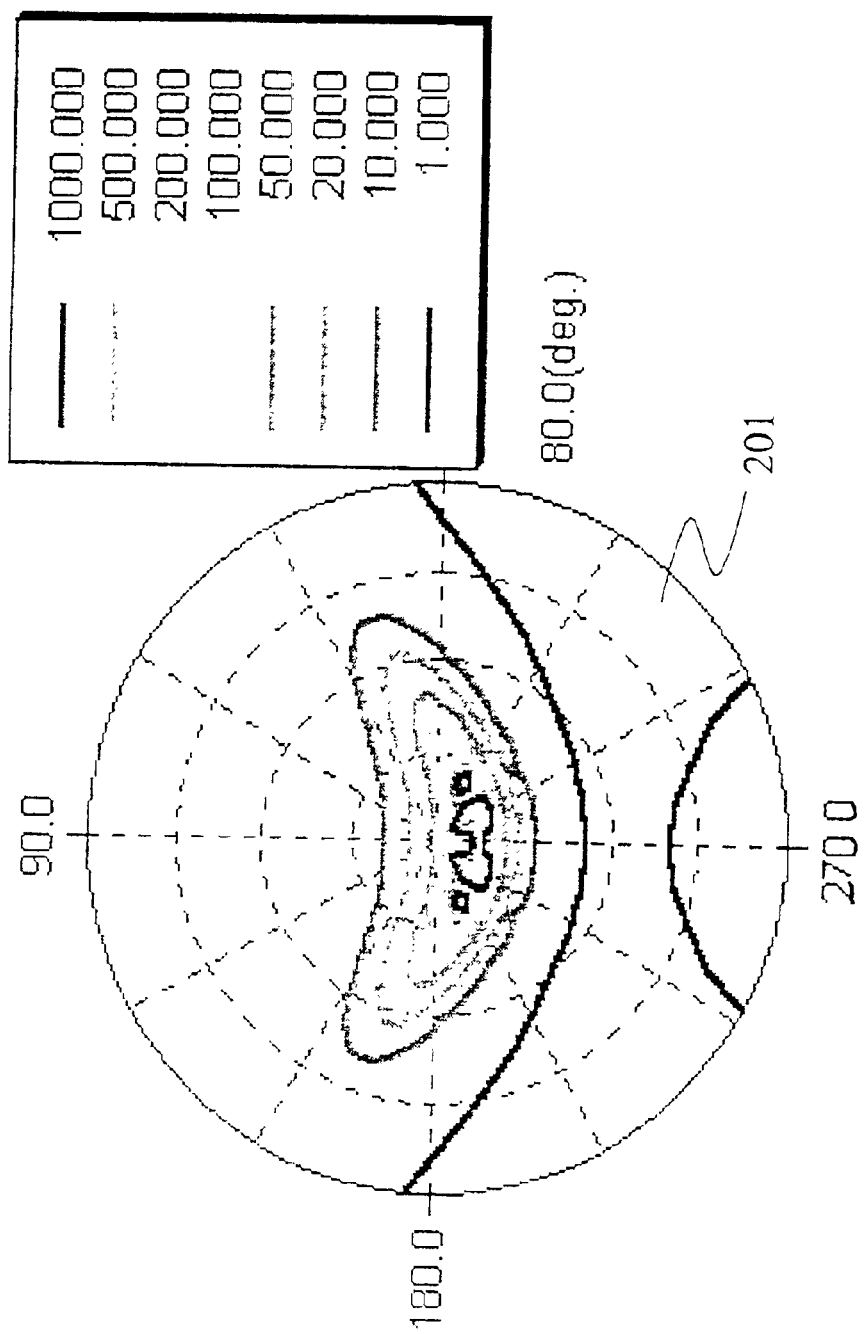
FIG. 2a shows equal contrast ratio contours of liquid crystal molecules in a single domain liquid crystal display where the applied voltage is 1.5 volts and 2.5 volts and the pre-tilt angle of liquid crystal molecules is 1°.
Figure 2B:
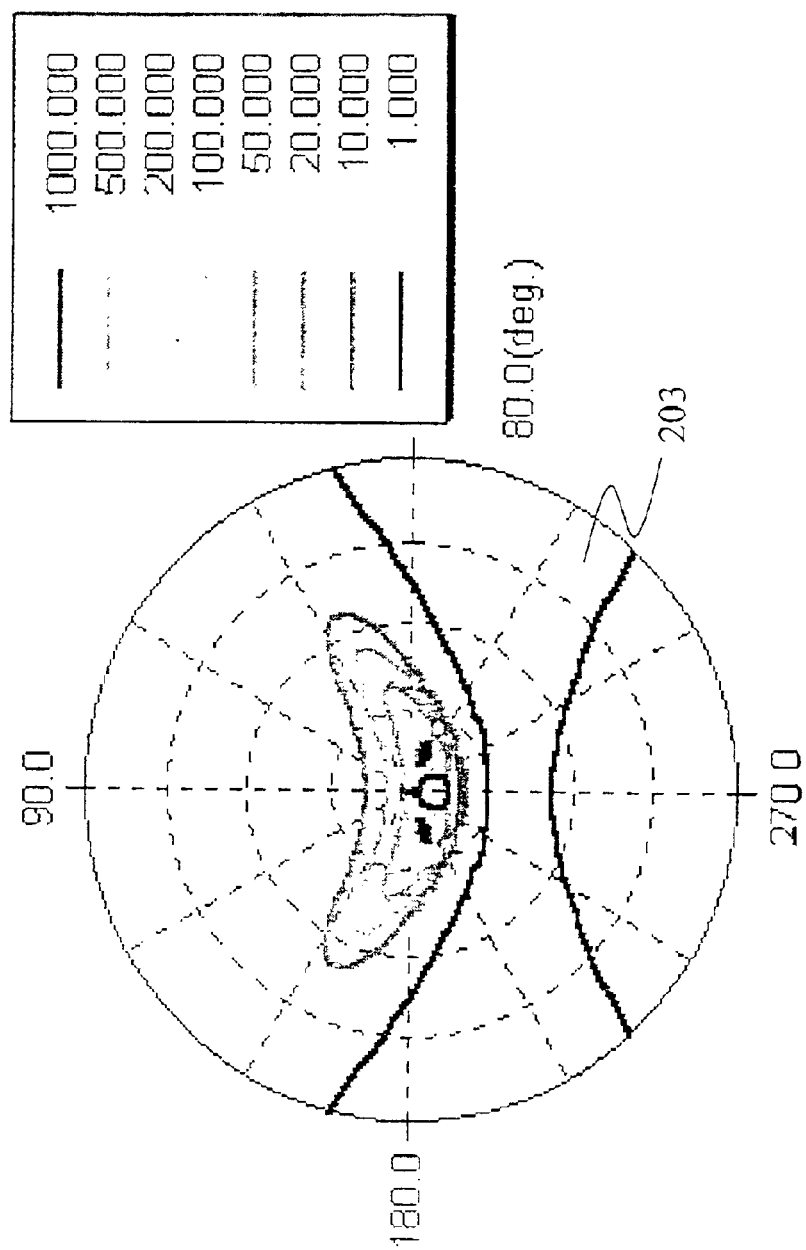
FIG. 2b shows equal contrast ratio contours of liquid crystal molecules in a single domain liquid crystal display where the applied voltage is 1.5 volts and 2.5 volts and the pre-tilt angle of liquid crystal molecules is 12°.
Figure 2C:
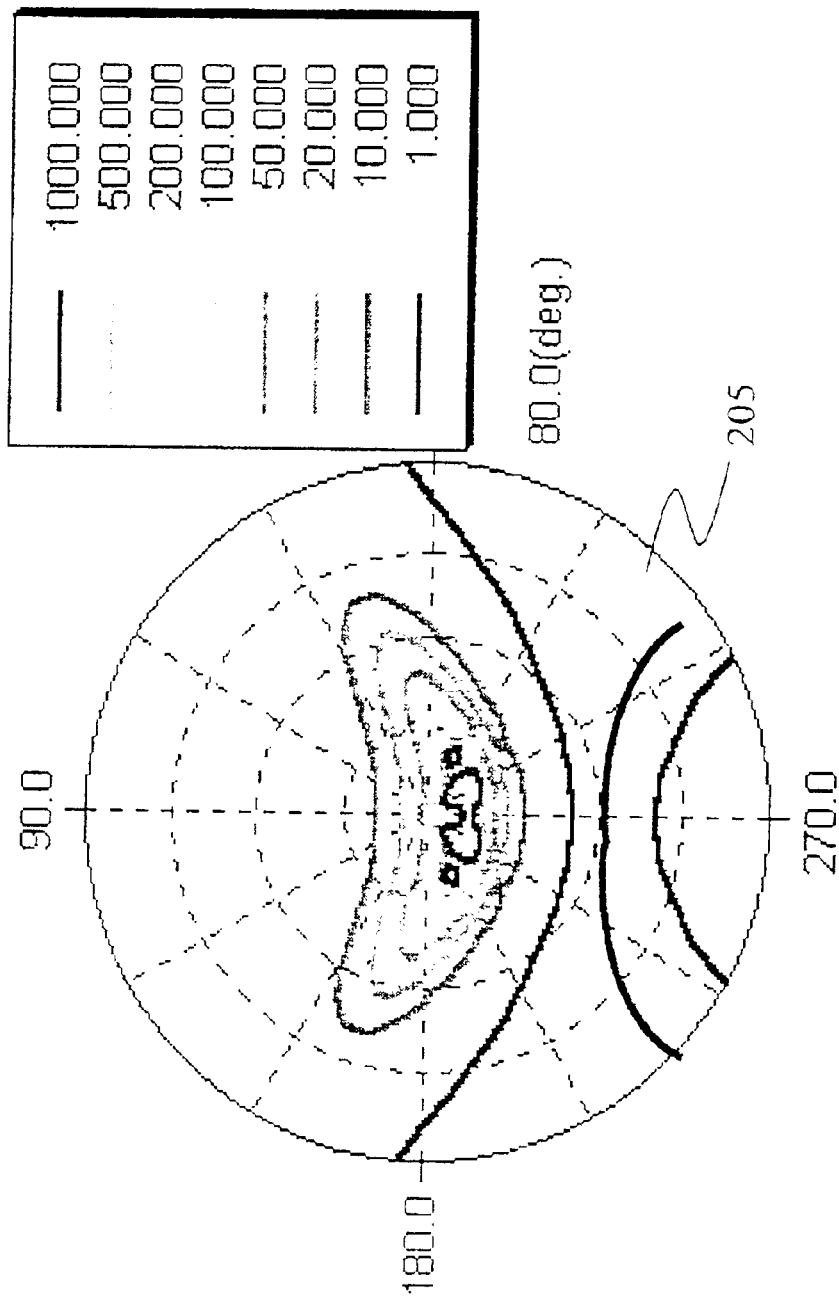
FIG. 2c shows equal contrast ratio contours of liquid crystal molecules in a multi-domain liquid crystal display where the applied voltage is 1.5 volts and 2.5 volts and the pre-tilt angles of liquid crystal molecules are between 1° and 12°.

FIG. 3a shows a cross-sectional view of an active matrix device structure according to the invention. Referring to FIG. 3a, four regions B, A, C and D of various height levels are formed respectively using multiple photo-masks by a conventional process for a metal or an insulation layer. A dielectric substrate 300 is used to form the active matrix device structure that comprises, from bottom to top, a first metal layer 301, a first insulator layer 302, an A-Si layer 303, a second metal layer 311, a second insulator layer 312, and a transparent layer 313. In the four regions of various height levels, the height of region B is 700 nm and the range of the preferred height can be within plus or minus 300 nm. The height of region A is 1150 nm and the range of the preferred height can be within plus or minus 550 nm. Region C has no height. The height of region D is 900 nm and the range of the preferred height can be within plus or minus 400 nm.

Figure 3C:
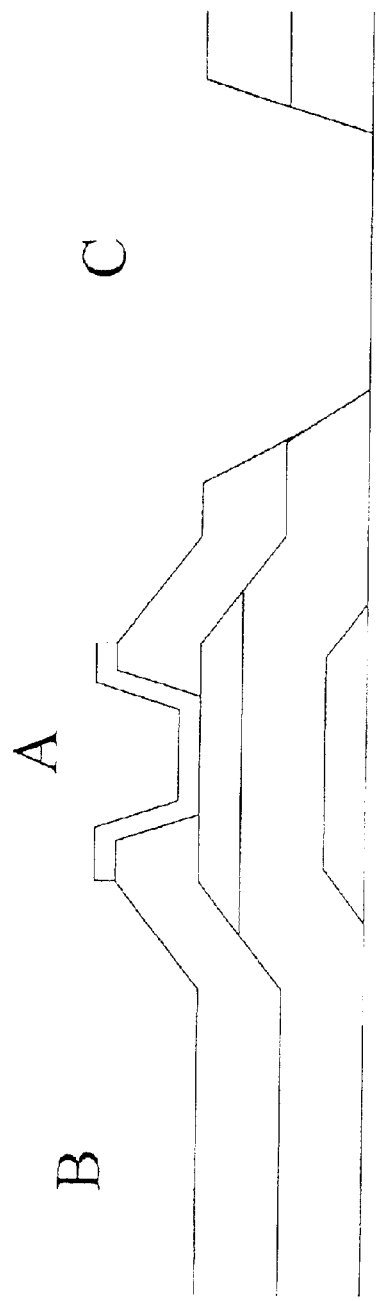
FIG. 3c shows a cross-sectional view of forming three regions B, A and C of various height levels on an active matrix device structure according to the invention.
Figure 3D:
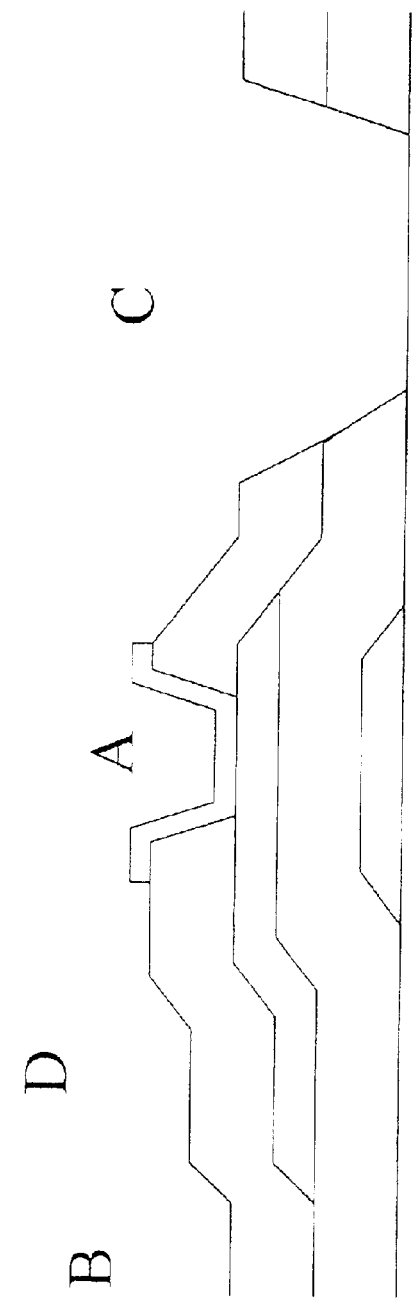
FIG. 3d shows a cross-sectional view of forming four regions B, D, A and C of various height levels on an active matrix device structure according to the invention.

As stated before, the liquid crystal display of this invention uses primarily conventional process for fabricating a metal or an insulation layer of an active matrix device to form multiple domains within a pixel area. Conventional process for a metal or an insulation layer of an active matrix device takes four to seven photo-masks to form two to four regions of various height levels according to the invention. FIG. 3b shows a cross-sectional view of forming two regions B and A of different height levels on an active matrix device according to the invention. FIG. 3c shows a cross-sectional view of forming three regions B, A and C of various height levels on an active matrix device according to the invention. FIG. 3d shows a cross-sectional view of forming four regions B, D, A and C of various height levels on an active matrix device according to the invention.

Figure 4A:
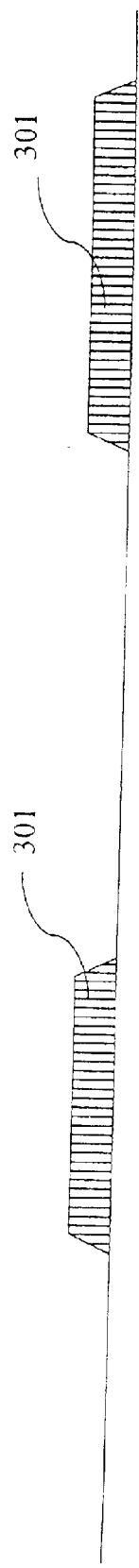
Figure 4B:
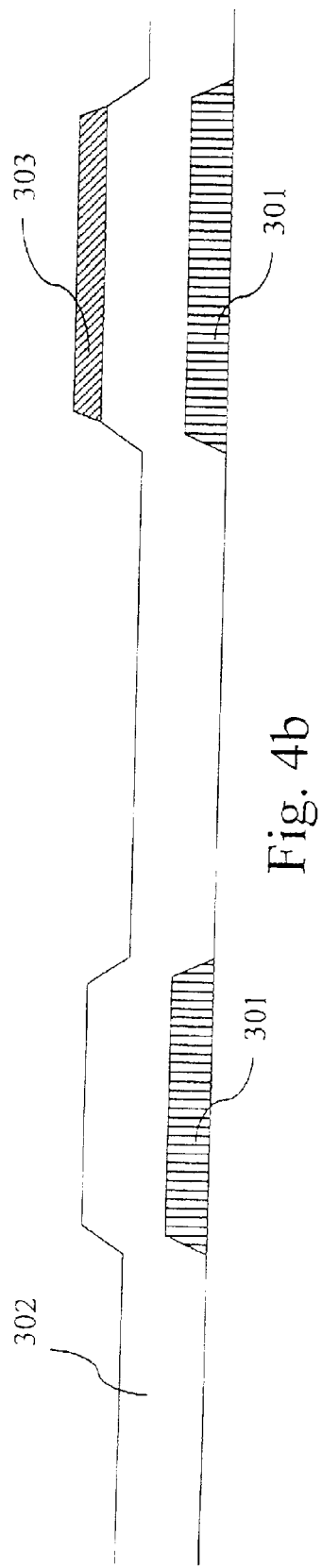

FIGS. 4a–4d show sequentially the process for forming four regions B. D, A and C of various height levels on an active matrix device shown in FIG. 3a. FIG. 4a shows that a patterned first metal layer 301 is formed on a dielectric substrate (not shown). The height of the metal layer 301 is 250 nm and the range of the preferred height can be within plus or minus 200 nm. FIG. 4b shows that a first insulator layer 302 covers the first metal layer 301 and the patterned A-Si layer 303 is formed on the first insulator layer 302. The material for the first insulator layer 302 can be SiNx. The height of the first insulator layer 302 is 400 nm and the range of the preferred height can be within plus or minus 300 nm. FIG. 4c shows that a patterned second metal layer 311 is formed above the insulator layer 302. The height of the second metal layer 311 is 250 nm and the range of the preferred height can be within plus or minus 200 nm. FIG. 4d shows that a second insulator layer 312 is formed above the insulator layer 302 and the second metal layer 311. Contact holes are formed by etching the second insulator layer 312 for contacting lower layers. The material for the second insulator layer 312 can be SiNx. The height of the second insulator layer 312 is 400 nm and the range of the preferred height can be within plus or minus 300 nm. Finally, a patterned transparent layer 313 is deposited on the second insulator layer 312 as illustrated in FIG. 3a. The material for the patterned transparent layer 313 can be indium tin oxide (ITO). The height of the transparent layer 313 is 100 nm and the range of the preferred height can be within plus or minus 100 nm.

The active matrix device of the present invention can be a thin film transistor or an active matrix device with a low temperature poly-Si (LTPS) structure. The preferred embodiment shown in FIGS. 4a–4d uses a thin film transistor as the active matrix device. In the following, FIGS. 5a–5g show another preferred embodiment that uses an active matrix device with a low temperature poly-Si structure and having four regions of various height levels.

FIG. 5a shows that a base coat layer 501 is formed on a dielectric substrate and a patterned poly-Si layer 503 is formed on the base coat layer 501. A first insulator layer SOS is deposited on the base coat layer 501 and the patterned poly-Si layer 503 as shown in FIG. 5b. A patterned first metal layer 507 is formed on the first insulator layer 505 as shown in FIG. 5c. A second insulator layer 509 is deposited above the device structure and contact holes are formed by etching the second insulator layer 509 for contacting the lower layers as shown in FIG. 5d.

FIG. 5e shows that a patterned second metal layer 511 is formed above the second insulator layer 509 as well as in the contact holes. Then, a third insulator layer 513 is deposited above the whole device structure and a contact hole is formed by etching the third insulator layer 513 for contacting the second metal layer 511 as shown in FIG. 5f. Finally, a transparent layer 515 is deposited on the third insulator layer 513 to form an active matrix device with a low temperature poly-Si structure having four regions of various height levels E, F, G and H as shown in FIG. 5g. The material for the transparent layer 515 can be indium tin oxide (ITO).

Figure 6:
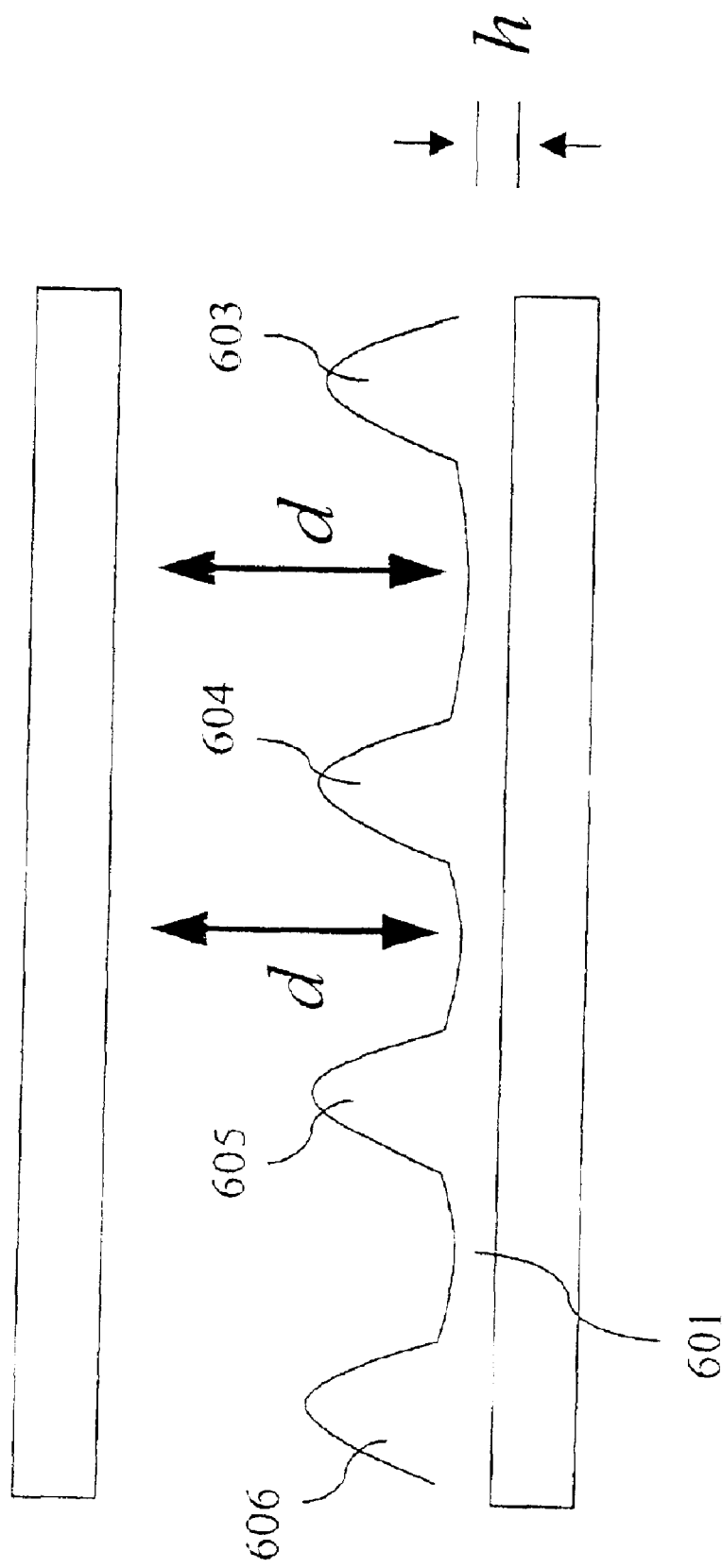
FIG. 6 shows a cross-sectional view of a conventional reflector structure of a reflective liquid crystal display that has the diffusing layer of uniform film thickness, uniform height and unique shape and the same cell gaps.

Conventional reflector structure of a reflective liquid crystal display is fabricated on an active matrix device structure without regions of various height levels. Its fabrication process includes resin coating, exposing, developing, baking and forming the cell structure. The diffusing layer of the photo-resist material formed by this conventional method has uniform film thickness and height and a unique shape. Also, cell gaps produced by this conventional method are the same. As shown in FIG. 6, the film thickness h of the diffusing layer 601 of the photo-resist material, the height and shape of the extruded bumps 603–606, and cell gap d are the same. Therefore, this conventional method has a drawback that liquid crystal cells can form only a single domain.

The reflector fabrication process for a multi-domain liquid crystal display of the invention can form multiple domains within a pixel area. It uses a multi-gap reflector process to form a structure of multi-domain reflective layer on an active matrix device structure with regions of various height levels. The following describes the multi-gap reflector process of the invention on an active matrix device structure with two regions of various height levels.

Figure 7C:
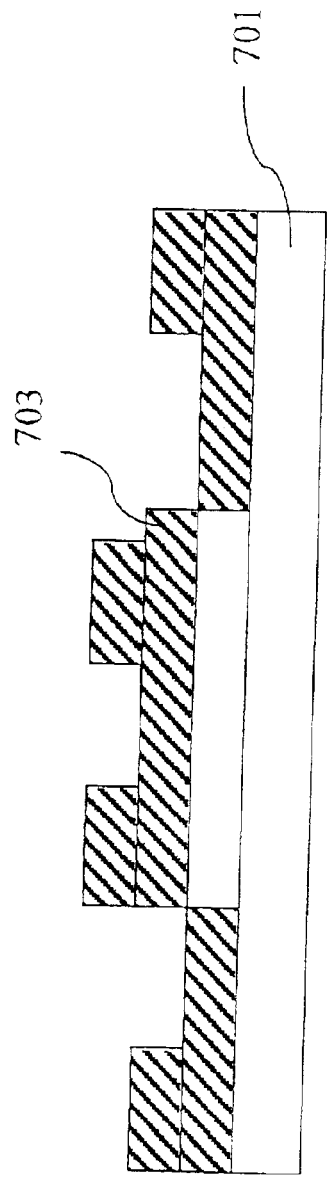
FIGS. 7c–7d show respectively the development and bake of the layer of photo-resist material after exposing.
Figure 7D:
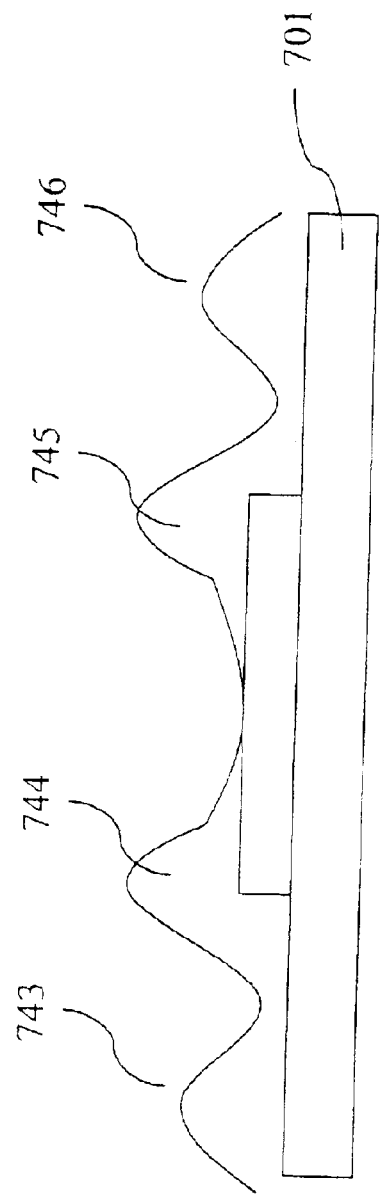
Figure 7E:
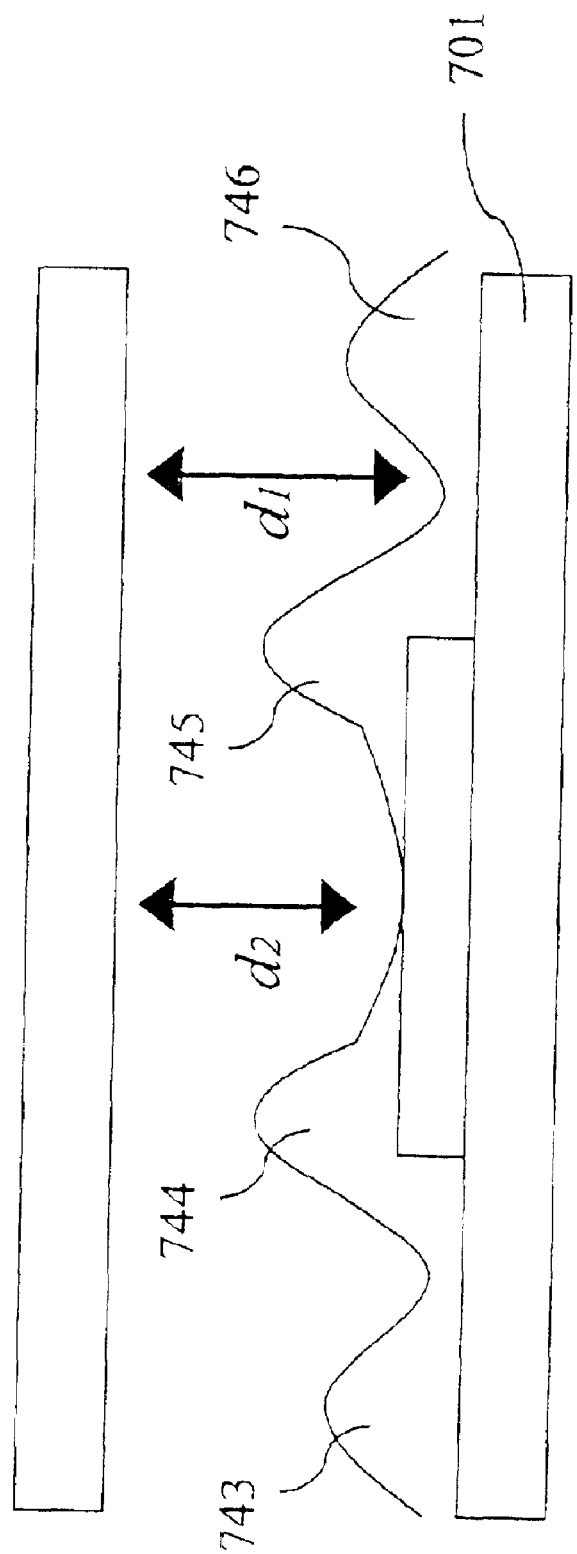
FIG. 7e shows that liquid crystal cells form multiple cell gaps within a pixel area after coating a reflective metal layer and forming the cell structure of the multi-domain reflective layer.

FIG. 7a shows a cross-sectional view of a simplified active matrix device structure with two regions of different height levels after depositing a layer of photo-resist material 703. FIG. 7b shows that a photo-mask 705 is used to expose the layer of the photo-resist material 703. FIG. 7c and FIG. 7d show respectively the development and bake of the layer of the photo-resist material 703 after exposing. As shown in FIG. 7d, the layer of the photo-resist material 703 forms a diffusing layer with multiple extruded bumps 743–746 having various film thickness and various heights and shapes. Finally, after coating a reflective metal layer and forming the cell structure of the multi-domain reflective layer, liquid crystal cells form multiple cell gaps $d_1$ and $d_2$ within a pixel area as illustrated in FIG. 7e. According to the invention, the multi-gap reflector process does not include any extra processing step.

Figure 8:
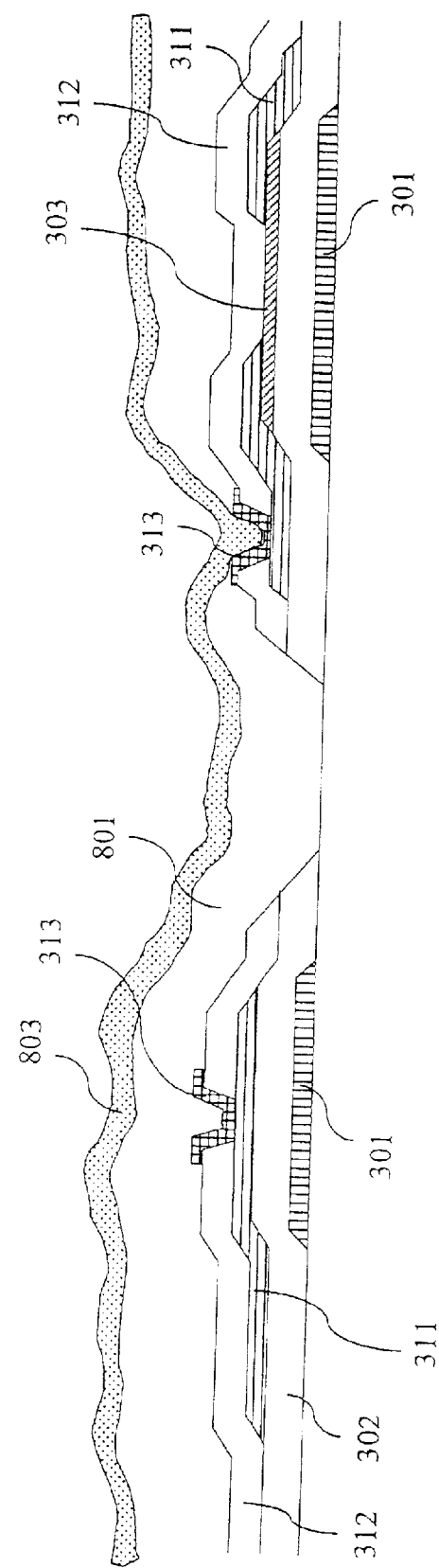

FIG. 8 shows a cross-sectional view of the structure of a multi-domain reflective layer manufactured by the multi-gap reflector process on an active matrix device structure with four regions of various height levels as shown in FIG. 3a. Referring to FIG. 8, a diffusing layer 801 with multiple extruded bumps of various film thickness and various heights and shapes is formed after coating a reflective metal layer 803. According to the invention, the average film thickness of the diffusing layer of the photo-resist material is between one-twentieth of a cell gap to one cell gap. The average height difference of the regions of various height levels is between zero to one-third of a cell gap. The average slope angle of the extruded bumps is between 0 to 10 degrees.

Figure 9C:
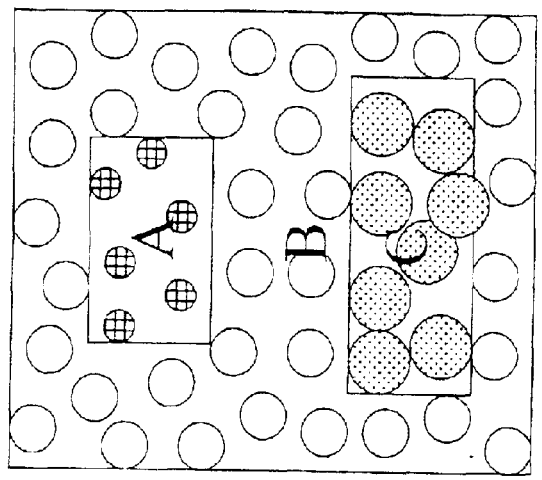
FIGS. 9a–9c show top views of a structure of multi-domain reflective layer manufactured by the multi-gap reflector process on an active matrix device structure with regions of various height levels within a pixel area.
Figure 9B:
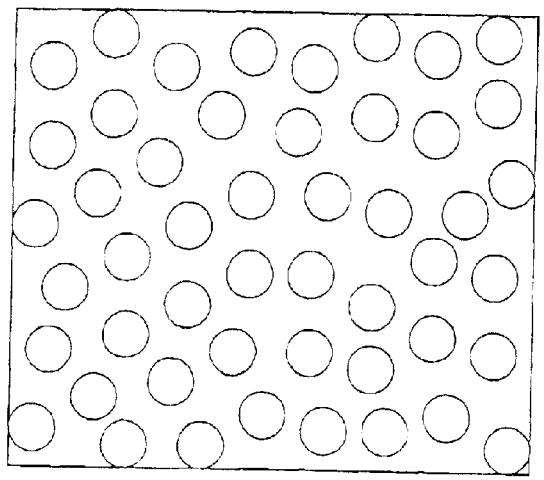
Figure 9A:
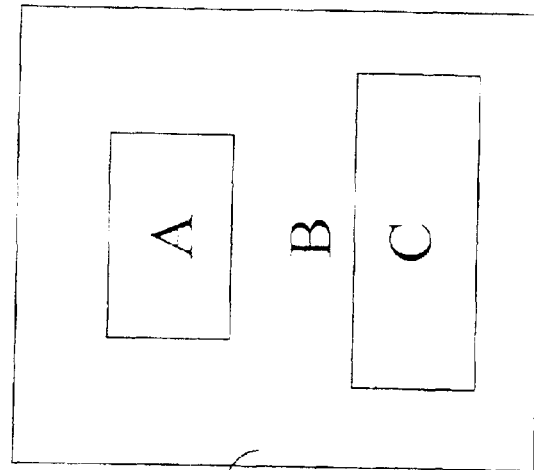

FIGS. 9a–9c show top views of the structure of a multi-domain reflective layer manufactured by the multi-gap reflector process on an active matrix device structure with regions of various height levels within a pixel area. FIG. 9a shows a top view of an active matrix device with three regions B, A and C of various height levels within a pixel area 901. FIG. 9b shows a patterned photo-mask used to expose the layer of the photo-resist material in the multi-gap reflector process. FIG. 9c shows that a diffusing layer with multiple extruded bumps of various film thickness and various heights and shapes is formed on the three regions B, A and C of various height levels after the multi-gap reflector process.

Figure 9D:
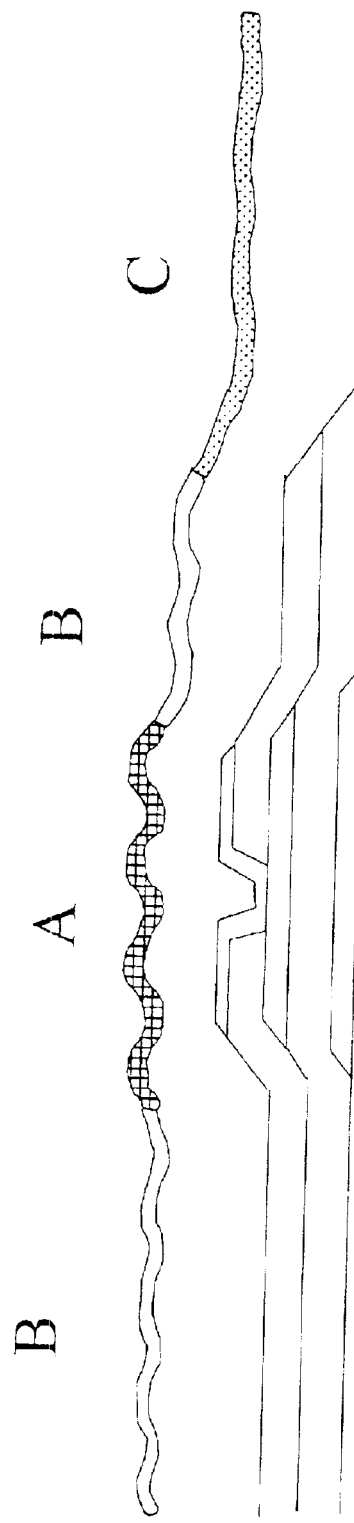
FIG. 9d shows a cross-sectional view of FIG. 9c.
Figure 9E:
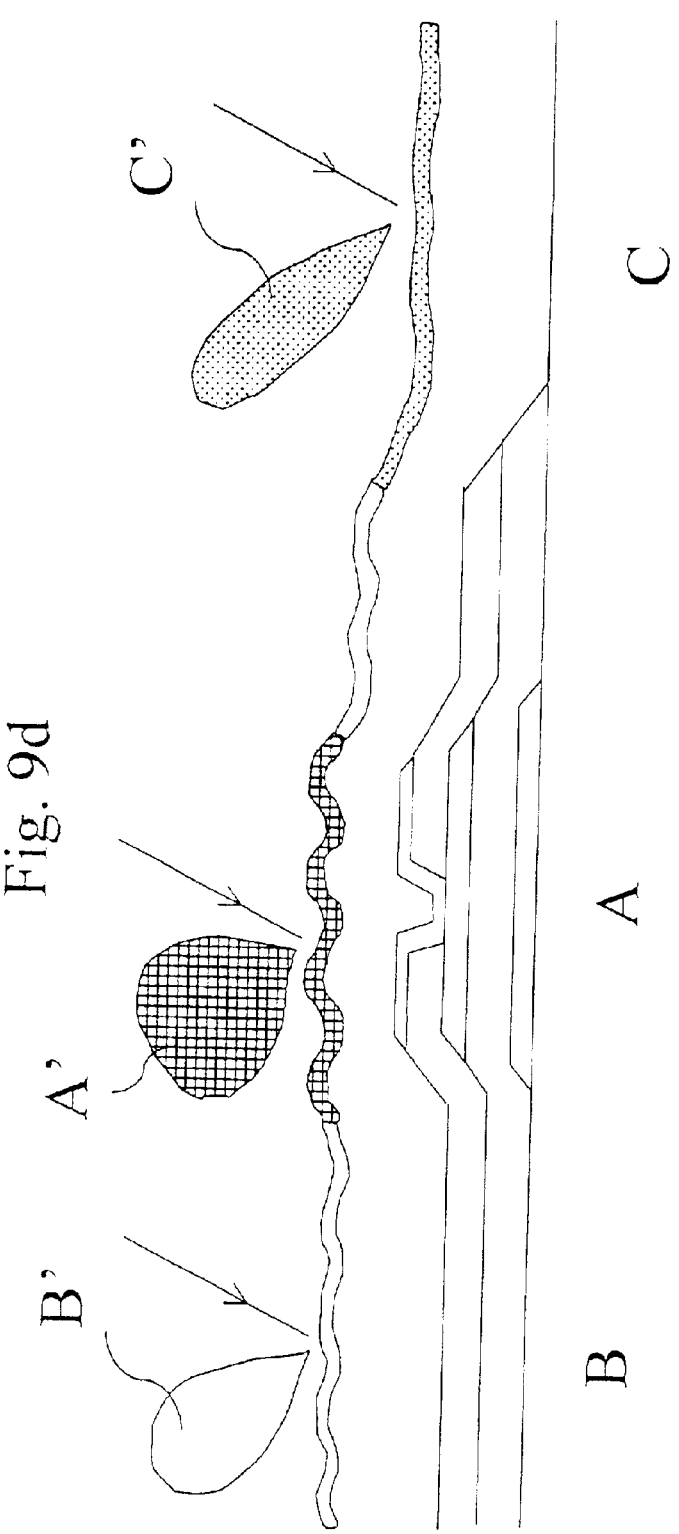
FIG. 9e shows that the structure of the reflective layer in FIG. 9d has various reflective angles and reflective effects.

FIG. 9d shows a cross-sectional view of FIG. 9c. FIG. 9e shows that the structure of the reflective layer in FIG. 9d has various reflective angles and reflective effects. Referring to FIG. 9e, when a light ray is incident to the surface of the diffusing layer, it has various scattering directions at different locations. The reason is due to the diffusing layer that has multiple extruded bumps of various film thickness and various heights and shapes on the three regions B, A and C. Therefore, the incident light ray has various reflective angles and reflective effects on the surface of the diffusing layer at the three regions B, A and C. Regions B', A' and C' show respectively three ranges of light angles, or the so-called possible scattering areas, when light is incident to the surface of the diffusing layer at the three regions B, A and C. Referring to FIG. 9e, the region A' is wider than regions B' and C' because the heights and shapes of the extruded bumps at region A is more distinct than those at regions B and C.

The structure of the multi-domain reflective layer of the invention can be used in the structure of a reflective or semi-reflective twisted nematic, super twisted nematic, thin film transistor, or thin film diode. After depositing a reflective metal layer and forming the cell structure of a multi-domain reflective layer, the structure of the multi-domain liquid crystal display can be used for the structure of a reflective, or semi-reflective TFT-LCD that can be one of self-compensated twisted nematic, reflective twisted nematic, reflective electrical controlled birefringence or mixed mode twisted nematic thin film transistor liquid crystal display.

Figure 10A:
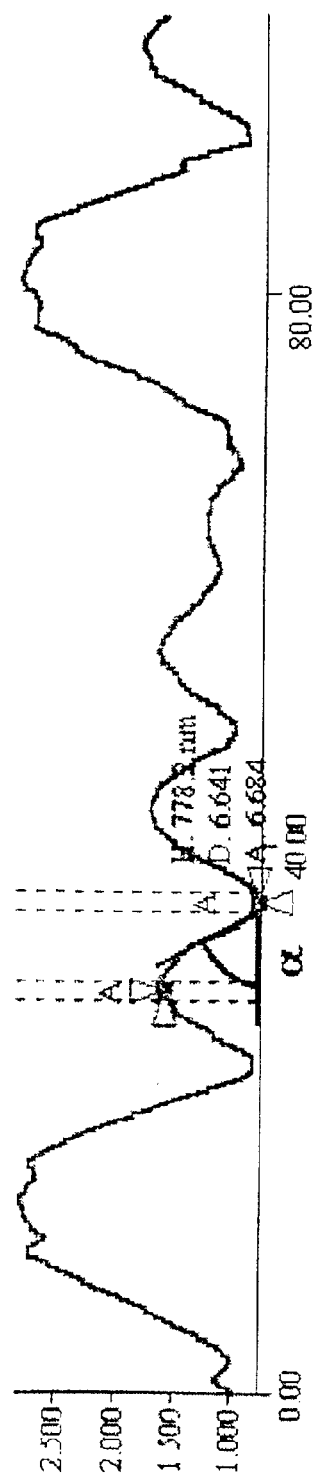
FIG. 10a illustrates a cross-sectional view of the three dimensional image of the diffusing layer at region A shown in FIG. 9c.
Figure 10B:
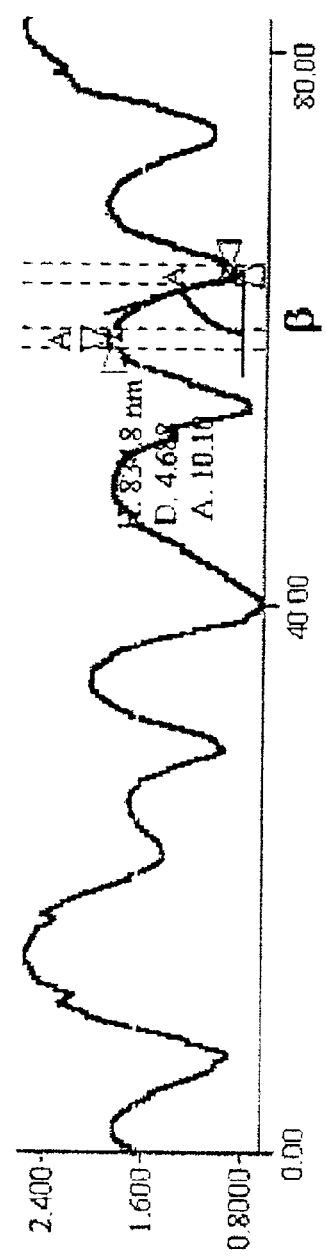
FIG. 10b illustrates a cross-sectional view of the three dimensional image of the diffusing layer at region B shown in FIG. 9c.

FIG. 10a is a diagram illustrating the cross-sectional view of the three dimensional image of the diffusing layer at region A shown in FIG. 9c, where the film thickness of the diffusing layer of the photo-resist material is 0.778 µm and the slope angle α of the extruded bump is 6.68°. FIG. 10b is a diagram illustrating the cross-sectional view of the three dimensional image of the diffusing layer at region B shown in FIG. 9c, where the film thickness of the diffusing layer of the photo-resist material is 0.835 µm which is thicker than that in FIG. 10a and the slope angle β of the extruded bump is 10.1°. Because of the difference between slope angles of the extruded bumps, the reflector structure is a multi-domain structure with various reflective angles and reflective effects. Therefore, its optical effect is much better than that of a diffusing layer in a single domain structure.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. A reflector fabrication process for a multi-domain liquid crystal display comprising the steps of:
   (a) preparing a base substrate comprising a dielectric material;
   (b) using multiple photo-masks to form an active matrix device structure including a first insulator layer on said base substrate, said active matrix device structure being formed with a plurality of regions of different height levels with the steps of:
      (b1) forming a patterned first metal layer on said base substrate;
      (b2) depositing a first insulator layer on said patterned first metal layer and said base substrate;
      (b3) forming a patterned A-Si layer on said first insulator layer;
      (b4) forming a patterned second metal layer on said first insulator layer and said patterned A-Si layer;
      (b5) depositing a second insulator layer on said patterned second metal layer and said base substrate and etching said second insulator layer to form contact holes for contacting with lower layers; and
      (b6) depositing a patterned transparent layer on said second insulator layer to form an active matrix device structure with regions of various height levels;
   (c) using a multi-gap reflector process to form a structure of a multi-domain reflective layer above said active matrix device structure with regions of different height levels.

2. The reflector fabrication process for a multi-domain liquid crystal display as claimed in claim 1, wherein the height of said first metal layer in step (b1) is in the range of 50 nm to 450 nm, the height of said first insulator layer in step (b2) is in the range of 100 nm to 700 nm, the height of said second metal layer in step (b4) is in the range of 50 nm to 450 nm, the height of said second insulator layer in step (b5) is in the range of 100 nm to 700 nm, and the height of said transparent layer in step (b6) is in the range of 0 to 200 nm.

3. A reflector fabrication process for a multi-domain liquid crystal display comprising the steps of:
   (a) preparing a base substrate comprising a dielectric material;
   (b) using multiple photo-masks to form an active matrix device structure including a first insulator layer on said base substrate, said base substrate having a base coat layer covering said dielectric material and said active matrix device structure being formed with a plurality of regions of different height levels with the steps of:
      (b1) forming a patterned poly-Si layer on said base coat layer;
      (b2) depositing a first insulator layer on said patterned poly-Si layer and said base coat layer;
      (b3) forming a patterned first metal layer on said first insulator layer;
      (b4) depositing a second insulator layer on said patterned first metal layer and etching said second insulator layer to form contact holes for contacting with lower layers;
      (b5) forming a patterned second metal layer on said second insulator layer;
      (b6) depositing a third insulator layer on said patterned second metal layer; said second insulator layer and said base coat layer, and etching said third insulator layer to form contact holes for contacting with said second metal layer; and
      (b7) depositing a patterned transparent layer on said third insulator layer to form an active matrix device structure with regions of various height levels; and
   (c) using a multi-gap reflector process to form a structure of a multi-domain reflective layer above said active matrix device structure with regions of different height levels.

* * * * *